United States Patent [19]
Baas

[11] Patent Number: 5,248,888
[45] Date of Patent: Sep. 28, 1993

[54] PROCESS FOR POSITIONING A RECORD CHANGING DEVICE HAVING REFLECTIVE MARKERS

[75] Inventor: Dieter Baas, Kehl, Fed. Rep. of Germany

[73] Assignee: Deutsche Thomson Brandt GmbH, Villingen-Schwenningen, Fed. Rep. of Germany

[21] Appl. No.: 852,067

[22] Filed: Mar. 16, 1992

[30] Foreign Application Priority Data

Aug. 24, 1989 [DE] Fed. Rep. of Germany ....... 3927890

[51] Int. Cl.⁵ .............................................. G01V 9/04
[52] U.S. Cl. .................... 250/561; 414/274; 369/36
[58] Field of Search ............... 250/561, 563, 548, 557; 414/274, 277, 280; 369/34, 36

[56] References Cited

U.S. PATENT DOCUMENTS

| | | | |
|---|---|---|---|
| 4,580,254 | 4/1986 | Hojyo et al. | 369/39 |
| 4,839,758 | 6/1989 | Honjoh | 369/34 |
| 5,099,465 | 3/1992 | Geiger et al. | 369/36 |
| 5,161,138 | 11/1992 | Caspers | 369/34 |

FOREIGN PATENT DOCUMENTS

| | | |
|---|---|---|
| 0632189 | 9/1963 | Belgium . |
| 0135754 | 4/1985 | European Pat. Off. . |
| 0145268 | 6/1985 | European Pat. Off. . |
| 8809033 | 11/1988 | Fed. Rep. of Germany . |
| 1145679 | 10/1957 | France . |
| 2024635 | 8/1970 | France . |
| 2107046 | 5/1972 | France . |

*Primary Examiner*—David C. Nelms
*Assistant Examiner*—Que T. Le
*Attorney, Agent, or Firm*—J. S. Tripoli; E. P. Herrmann; L. L. Hallacher

[57] ABSTRACT

A method of adjusting the moveable unit of a positioning device having a light source and a photodetector for scanning markers identifying positions at which the moveable unit is to be located includes the steps of accurately and manually positioning the unit at one of the identifying positions. The unit is then automatically driven to a second position where the output signal of the photodetector is maximum. The deviation from the first position to the second position is stored as an offset which is subsequently used to accurately position the moveable unit.

5 Claims, 2 Drawing Sheets

PROCESS FOR POSITIONING A RECORD CHANGING DEVICE HAVING REFLECTIVE MARKERS

This is a continuation of PCT application PCT/EP 90/01188 filed Jul. 20, 1990 by Dieter Baas and titled "Process For Adjusting A Positioning Device".

BACKGROUND

This invention is directed to a process of adjusting a positioning device including a scanner which scans markers and a circuit for carrying out the process. Positioning devices are used in record players having record changers, and in jukeboxes to position the playing element in front of the magazine in which the individual records are stored. The device which transports the record to the playing element must be accurately positioned in the proximity of the desired record.

A compact disc changer having a magazine and a scanning device is described in WO-A-88/09033. The scanning device includes an optical transmitter to emit a laser beam, to scan the compartments of a magazine. The light beam is reflected from a compact disc lying in one of the compartments of the magazine onto a photodetector, the output of which is connected to a control circuit. The scanning device, which is mounted on a shaft driven by a motor, can be positioned in front of any compartment of the magazine. In order to precisely position the scanning device at the level of each individual magazine compartment, a disc with markers is mounted on one end of the shaft, and the disc is scanned by a second scanning device which serves as an incremental transmitter.

Patent GB-A 2 162 991 discloses a record changer having a ledge including slots, which serve as markers, positioned in front of the record magazine. The ledge is arranged between the optical transmitter and the optical detector of the light. The playing element is accurately positioned in front of a record by detecting the individual slots within the ledge. When the playing element passes a slot, the output voltage of the photo detector is approximately sine shaped, as shown in FIG. 1. The output of the photo detector is converted to a pulse, the rising or falling edge of which can be used to indicate that the playing element is positioned in front of a record.

In order to ensure exact positioning of the scanning device during normal operation, the scanning device must be precisely adjusted manually during production of the record changer. Accordingly, the scanning device is initially precisely positioned manually using a gauge and is then fixed into position. Subsequently the photodetector is also manually adjusted so that the output signal of the photodetector is maximized. These critical but essential adjustments are time consuming and expensive. The invention provides a simplified method of adjusting a positioning device that is quick and uncomplicated.

With the invention, the scanning device is precisely set at a defined position. The scanning device is then automatically moved until the output signal from the photodetector goes to maximum. The deviation between the first position and the second position is stored as an offset. During normal operation the scanning device is initially positioned at the position where the output signal of the detector is maximum. The scanning device then is moved by the stored offset to the final position. In another adjustment technique the sensor output is converted into a pulse and the pulse width is measured. The scanning device is then manually positioned at a defined position after which the scanning device is automatically positioned in a second position which is shifted by half of the pulse width from the first position.

DETAILED DESCRIPTION

Figure 2:
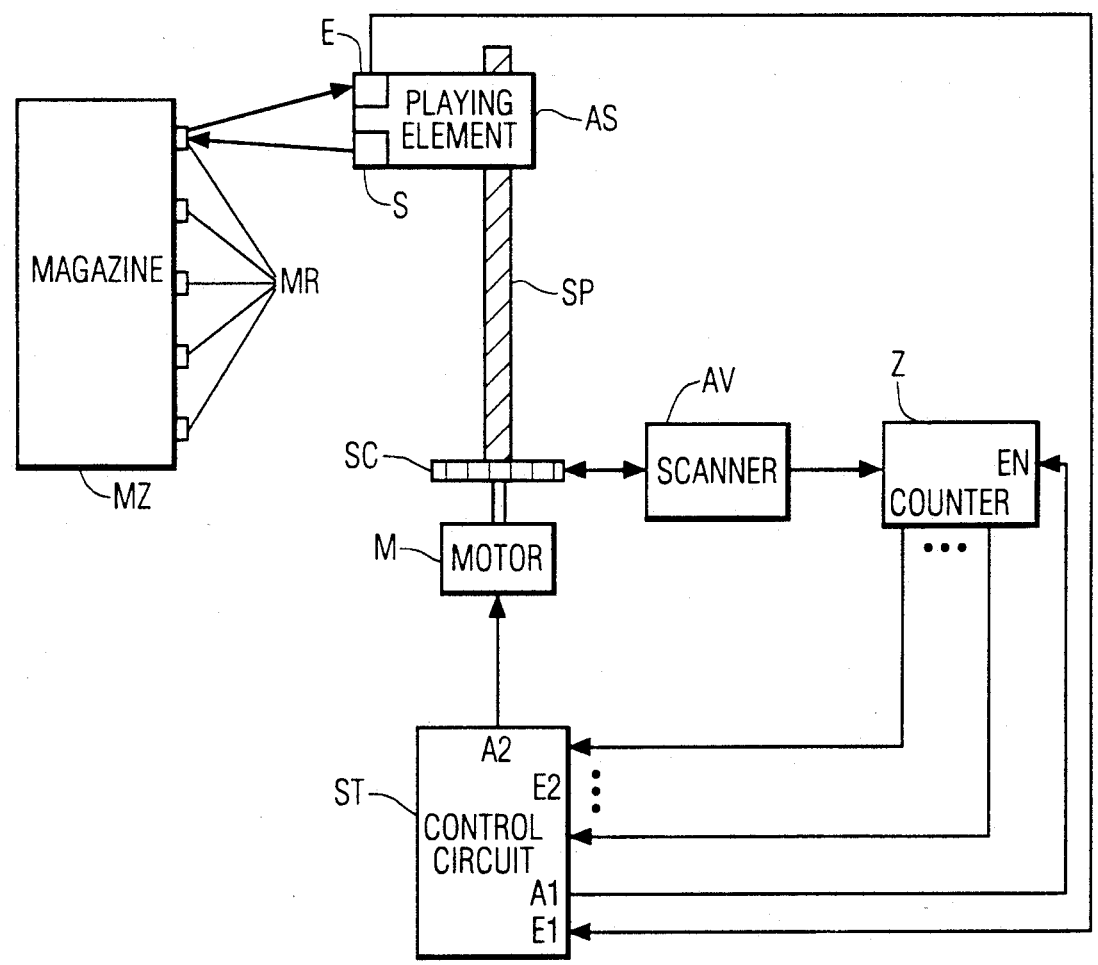
FIG. 2 is a preferred embodiment of a scanning device positioning system.

In FIG. 2, a record changer includes a magazine MZ having several compartments in which the individual records are stored. Markers MR are arranged at the front side of each of the compartments in the magazine MZ. The mechanism which removes the records is not illustrated for the sake of simplicity. An optical transmitter S is affixed to the playing element AS of the record changer and focuses light onto the front of the magazine MZ. The playing element AS is driven by a spindle SP and a motor M. When the scanning device is properly positioned light emitted by the optical transmitter S is reflected from the markers MR to a photodetector E, which also is affixed to the playing element AS. When the playing element AS is positioned where a record can be picked up the marker MR for that compartment reflects the light onto the photodetector E. The motor is then switched off so that the playing element AS remains in the removal position.

The photodetector E is connected to the input terminal E1 of a control circuit ST. A disc SC with markers which are scanned by the scanning device AV is driven by the motor M and the shaft SP. The output terminal of the scanning device AV is connected to the counting input terminal of a counter Z the output terminal of which is connected to one input terminal E2 of a control circuit ST. The Enable-input terminal EN of counter Z is connected to an output terminal A1 of the control circuit ST. An output terminal A2 of the control circuit ST is connected to the motor M.

When adjusting the scanning device using the inventive method, initially the playing element AS is manually moved using a gauge into the exact position to retrieve a record from the magazine MZ. Subsequently, the control circuit ST moves the playing element AS to the position where the output signal of the photodetector E is maximum. The disc SC is scanned by a scanning device AV, which also can be an optical scanning device, and the counter Z counts the number of rotations of the disc SC needs too move from the first manually set position to the second position where the output signal of the photodetector is maximum. The required number of counts is stored in a memory within the control circuit ST as offset. The direction of rotation of the motor M is also recorded in the memory. No further adjustment of the optical transmitter S and the photodetector E is required and the record changer is ready for service.

During normal operation the playing element AS is positioned in two steps. In the first step, the playing element AS is driven to the position where the output signal of the photodetector E is maximum. In the second step the playing element AS is moved the distance indicated by the offset which was stored during the adjustment of the scanning device. Accordingly, the playing element AS is exactly positioned during normal operation and time consuming and expensive adjustment during production is substantially reduced.

Figure 1:
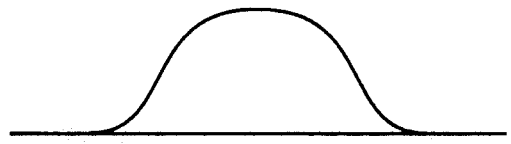
FIG. 1 shows the output voltage of a photo detector.

In another method the output signal of the photodetector E is converted into a pulse using a pulse shaper. The pulse width is determined using a counter Z to count the rotations of the disc SC between the rising and the falling edges of the pulse. The pulse count which indicates the pulse width is divided by two in a divider and the result is stored. The motor M is reversed for the number of rotations resulting from the division of pulse width count by two. The playing element AS is thus positioned exactly at the place where the output signal of the photodetector E is maximum because, as shown in FIG. 1, the maximum occurs in the middle of the signal.

During normal operation using the second method the playing element AS is also positioned in two steps. In the first step the playing element AS is moved until the pulse shaper provides a pulse to the control circuit ST. The first edge of the pulse (either the rising or the falling) indicates to the control circuit that disc rotation must be continued in the same direction and for the distance indicated by the number of counts stored in the memory during the initial adjustment of the device.

Figure 3:
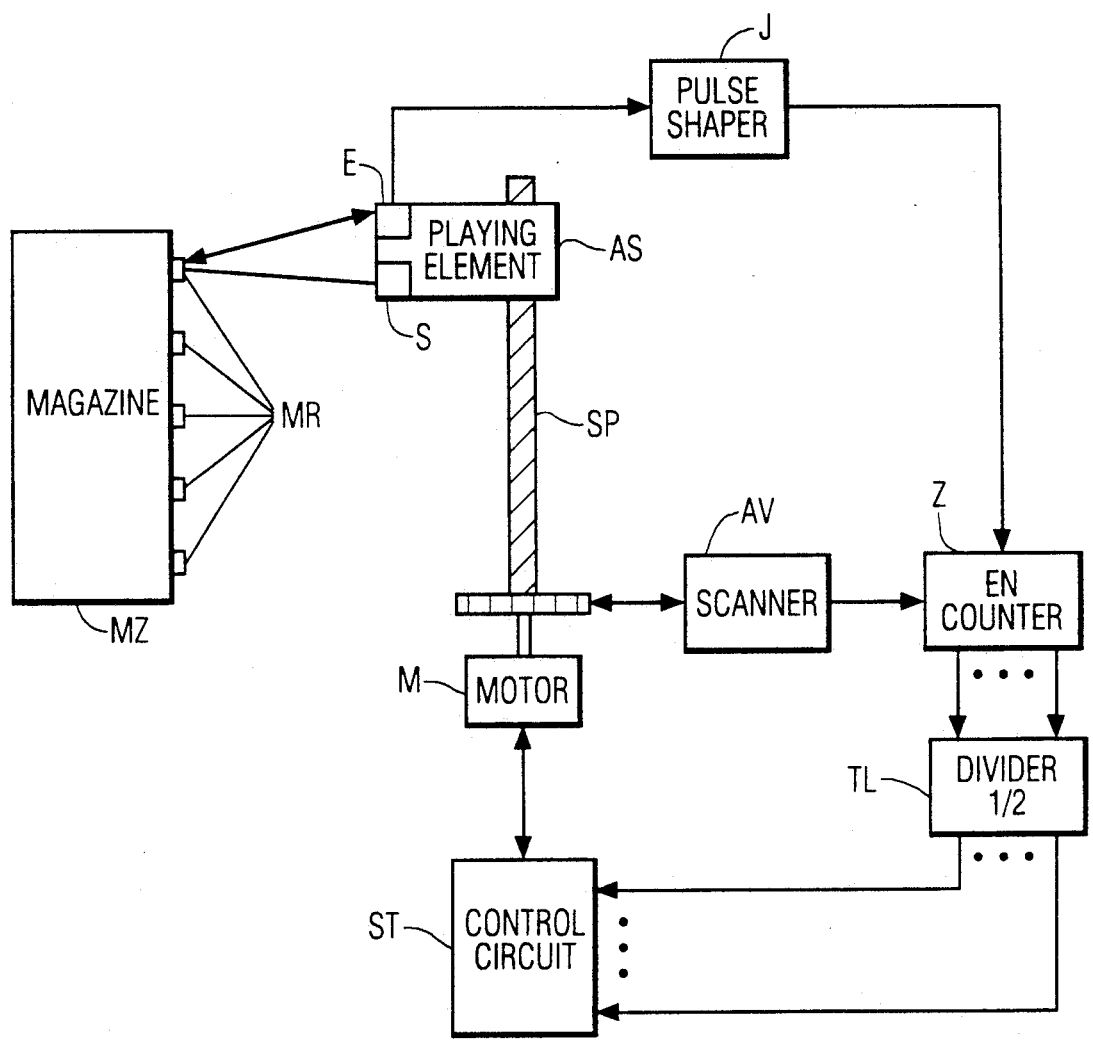
FIG. 3 is another preferred embodiment of a scanning device positioning system.

FIG. 3 shows a circuit useful with the second method. The output signal of the photodetector E is connected to the input terminal of a pulse shaper J the output terminal of which is connected to the Enable-input terminal EN of a counter Z. The marks on a disc SC, which is rotated by a motor M, are scanned by a scanning device AV, the output terminal of which is connected to the counting input terminal of the counter Z. The output terminal of the counter Z is connected to the input terminal of a divider TL, the output terminal of which is connected to the control circuit ST. The output terminal of the control circuit ST is connected to the motor M.

Initially in the adjustment process, the control circuit ST actuates the motor M and the playing element AS passes over one of the markers MR and the width of the marker is determined. The counter Z begins to count on the rising edge of the pulse provided by the pulse shaper J and stops counting on the falling edge, the number of counts is representative of the rotation of the disc SC during the pulse duration. The counter indication is therefore also representative of the width of the mark MR. The counter indication is divided in half and stored in the control circuit ST.

In a second step of the adjustment process the playing element AS is manually set in a defined first position. In a third step of the process the control circuit ST automatically shifts the playing element by half of the width of the marker MR from the first position to a second position. Accordingly, only the optical transmitter S and the photodetector E must be manually adjusted to coincide with the first transition of the output pulse from the pulse shaper. It is a simple task to adjust according to a pulse transition and therefore the adjustment can be made quickly and very precisely.

In general the invention is suitable for devices for positioning a unit. Scanning of the markers can be effected for example optically, inductively, capacitively or mechanically. The invention is particularily suitable for use with record changers.

I claim:

1. A method for adjusting a linearly moveable unit of a positioning device having a light source and a photodetector for scanning markers which identify positions to which said moveable unit is to be moved comprising the steps of:

accurately and manually positioning said unit at a first of said positions;

automatically driving said unit to a second position where the output signal of said photodetector is maximum; and storing any deviation from said first position to said second position as an offset indicative of the distance moved between said first and second positions.

2. A method of operating a positioning device adjusted in accordance with the method of claim 1 comprising the steps of:

automatically moving said unit to said second position; and further moving said unit the distance indicated by said offset.

3. A method for adjusting a linearly moveable unit of a positioning device having a light source and a photodetector for scanning markers which identify positions to which said moveable unit is to be moved comprising the steps of:

moving said light source and said photodetector past one said markers to produce an output signal;

converting said output signal to a pulse;

measuring the pulse width of said pulse; and dividing said pulse width by two and storing the result as an offset indicative of the distance moved;

accurately and manually positioning said unit at a first of said identifying positions; and automatically driving said unit to a second position displaced from said first position by said offset.

4. A method of operating a positioning device adjusted in accordance with the method of claim 3 comprising the steps of:

automatically moving said unit in a selected direction until the leading edge of said pulse is detected and continuing to move said unit in said selected direction and for said distance indicated by said offset.

5. The method of claim 3 wherein said output signal is converted to a pulse using a counter for recording revolutions of a rotating motor which drives said unit.

* * * * *